United States Patent
Lin et al.

(10) Patent No.: US 10,423,122 B2
(45) Date of Patent: Sep. 24, 2019

(54) LENS-FREE IMAGE SENSOR USING PHASE-SHIFTING HOLOGRAM

(71) Applicant: VisEra Technologies Company Limited, Hsin-Chu (TW)

(72) Inventors: Kuo-Feng Lin, Kaohsiung (TW); Chin-Chuan Hsieh, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 0 days.

(21) Appl. No.: 15/669,548

(22) Filed: Aug. 4, 2017

(65) Prior Publication Data

US 2019/0041794 A1 Feb. 7, 2019

(51) Int. Cl.
| | |
|---|---|
| H04N 9/47 | (2006.01) |
| H04N 7/18 | (2006.01) |
| G03H 1/00 | (2006.01) |
| G03H 1/04 | (2006.01) |
| H04N 9/077 | (2006.01) |
| G03H 1/26 | (2006.01) |
| H04N 5/225 | (2006.01) |

(52) U.S. Cl.
CPC ......... *G03H 1/0005* (2013.01); *G03H 1/0443* (2013.01); *G03H 1/2645* (2013.01); *H04N 9/077* (2013.01); *G03H 2001/0458* (2013.01); *G03H 2226/11* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 2009/0153729 | A1* | 6/2009 | Hiltunen | H04N 5/2251 348/371 |
| 2010/0165301 | A1* | 7/2010 | Kojima | G02B 27/48 353/38 |
| 2010/0208096 | A1* | 8/2010 | Takeda | H04N 5/2353 348/222.1 |

(Continued)

FOREIGN PATENT DOCUMENTS

| | | |
|---|---|---|
| CN | 104103654 A | 10/2014 |
| CN | 104252844 A | 12/2014 |

(Continued)

OTHER PUBLICATIONS

An Office Action from corresponding TW Application No. 107115257 dated Dec. 12, 2018; 10 pgs.

(Continued)

*Primary Examiner* — Talha M Nawaz
(74) *Attorney, Agent, or Firm* — Muncy, Geissler, Olds & Lowe, P.C.

(57) ABSTRACT

An image sensor is provided. The image sensor includes: a plurality of photoelectric elements for receiving an incident light. The photoelectric elements are arranged into a plurality of unit cells, and each of the unit cells includes a first photoelectric element and a second photoelectric element. The first photoelectric element in each of the unit cells captures a first pixel in a first phase, and the second photoelectric element in each of the unit cells captures a second pixel in a second phase, wherein the first phase is different from the second phase.

19 Claims, 13 Drawing Sheets

(56) References Cited

U.S. PATENT DOCUMENTS

| | | | | |
|---|---|---|---|---|
| 2011/0157445 A1* | 6/2011 | Itonaga | ............. | H01L 21/76898 |
| | | | | 348/308 |
| 2011/0273597 A1* | 11/2011 | Ishiwata | ........... | H01L 27/14603 |
| | | | | 348/272 |
| 2014/0267702 A1* | 9/2014 | Profitt | .................. | G01B 11/022 |
| | | | | 348/136 |
| 2017/0176178 A1* | 6/2017 | Inukai | .................... | B25J 9/1612 |

FOREIGN PATENT DOCUMENTS

| | | |
|---|---|---|
| JP | 2013-508775 | 3/2013 |
| JP | 2017037273 A | 2/2017 |
| TW | I301615 B | 10/2008 |
| TW | 201616853 A | 5/2016 |
| TW | I54509 B | 9/2016 |
| TW | 201720134 A | 6/2017 |
| WO | WO 2014/034729 | 3/2014 |

OTHER PUBLICATIONS

Japanese Patent Office, Office Action in Corresponding Application JP 2017-214953, dated Jan. 29, 2019, 4 pages.

* cited by examiner

LENS-FREE IMAGE SENSOR USING PHASE-SHIFTING HOLOGRAM

BACKGROUND OF THE INVENTION

Field of the Invention

The present invention relates to an imaging sensor and, in particular, to a lens-free image sensor using phase-shifting hologram.

Description of the Related Art

With advances being made in technology, electronic devices equipped with a camera have become very popular. However, a modular lens in a conventional camera, a.k.a. a color image sensing (CIS) device, is generally an essential component for capturing incoming light and converting captured light into digital images. However, due to the limitations of conventional imaging techniques, an image is formed with a lens, and a modular lens takes up a large portion of the available space within the camera. Since the size of portable electronic devices has become smaller and smaller, a large-sized modular lens is not appropriate for these devices.

Accordingly, there is demand for a lens-free image sensor to reduce the size of the camera.

BRIEF SUMMARY OF THE INVENTION

A detailed description is given in the following embodiments with reference to the accompanying drawings.

An image sensor is provided. The image sensor includes: a plurality of photoelectric elements for receiving an incident light. The photoelectric elements are arranged into a plurality of unit cells, and each of the unit cells includes a first photoelectric element and a second photoelectric element. The first photoelectric element in each of the unit cells captures a first pixel in a first phase, and the second photoelectric element in each of the unit cells captures a second pixel in a second phase, wherein the first phase is different from the second phase.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
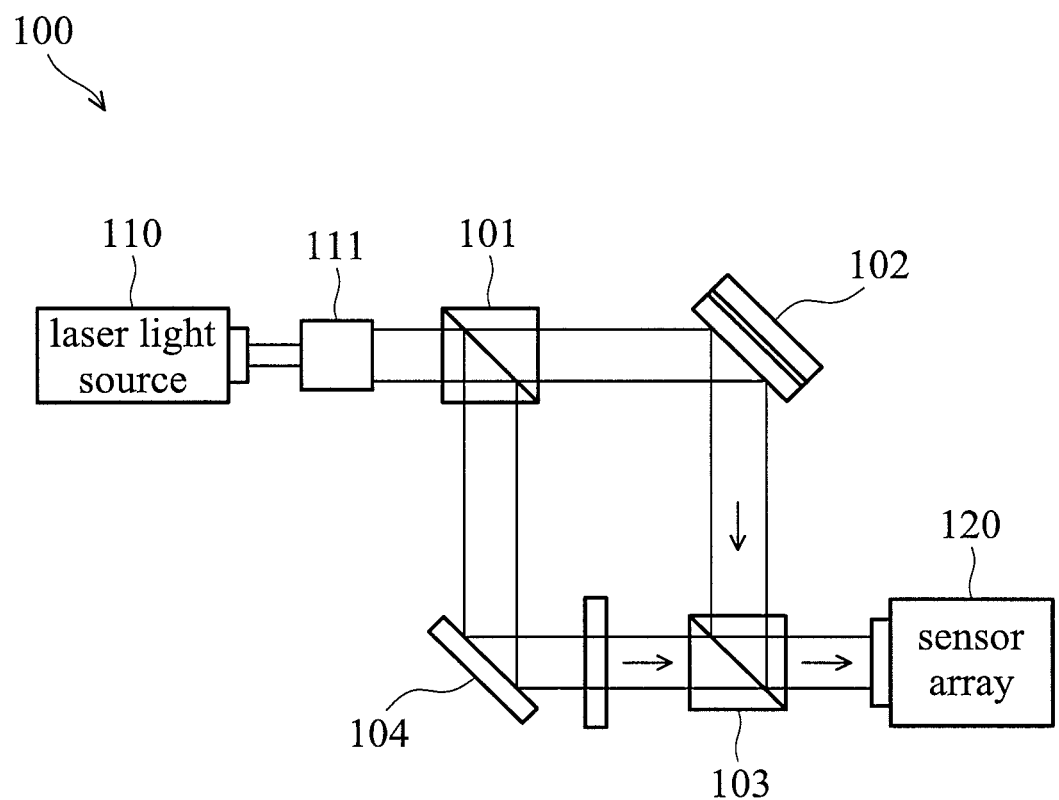
FIG. 1 is a schematic diagram of a phase-shifting digital holography device.

FIG. 1 is a schematic diagram of a phase-shifting digital holography device. As illustrated in FIG. 1, the phase-shifting digital holography device 100 includes a laser light source 110, a beam emitter 111, beam splitters 101 and 103, a piezoelectric transducer (PZT) mirror 102, a mirror 104, and a sensor array 120. The laser light that emitted from the laser light source 110 is further enhanced at the beam emitter 111, and the light emitted from the beam emitter is split into an object light and a reference light by the beam splitter 101. The reference light is reflected by the PZT mirror 102 that phase modulates the beam. By shifting a constant phase to the reference beam, different holograms are obtained to derive the complex amplitude of the object wave.

For example, the initial phase of the reference wave is zero and changes by $\pi/2$ at each step. Assuming a 4-step phase-shifting digital holography algorithm is used and the intensity of the interference patterns at different phases such as 0, $\pi/2$, $\pi$, and $3\pi/2$ can be respectively expressed in the formulas (1)~(4):

$$I_0=|\psi_o|^2+|\psi_r|^2+\psi_o\psi_r^*+\psi_o^*\psi_r \qquad (1)$$

$$I_{\pi/2}=|\psi_o|^2+|\psi_r|^2+j\psi_o\psi_r^*-j\psi_o^*\psi_r \qquad (2)$$

$$I_\pi=|\psi_o|^2+|\psi_r|^2-\psi_o\psi_r^*-\psi_o^*\psi_r \qquad (3)$$

$$I_{3\pi/2}=|\psi_o|^2+|\psi_r|^2-j\psi_o\psi_r^*+j\psi_o^*\psi_r \qquad (4)$$

After obtaining the intensity of the interference patterns at phases 0, $\pi/2$, $\pi$, and $3\pi/2$, the complex amplitude of the object light is given by:

$$\psi_0 = \frac{(I_0 - I_\pi) - j(I_{\pi/2} - I_{3\pi/2})}{4\psi_r^*} \quad (5)$$

The complex amplitude of the object light is sometimes referred to as the complex hologram because we can retrieve the amplitude distribution of the object light in the object plane from $\Psi_0$ by performing digital back-propagation.

Accordingly, the complex amplitude of the reference light must be known in order to calculate object waves. Usually, the reference light is a plane wave or a spherical wave and therefore its phase is known without any measurement. One having ordinary skill in the art will appreciate the techniques for reconstructing an object image using object waves at different phases, and thus the details will be omitted here.

It should be noted that the phase-shifting digital holography device 100 described in the example of FIG. 1 has to change phase at each step, and it takes time to change phase, calculate the intensities of interference patterns, and reconstruct the object image. Accordingly, it is not practical to employ the device 100 in any portable electronic devices currently being sold on the market.

Figure 2A:
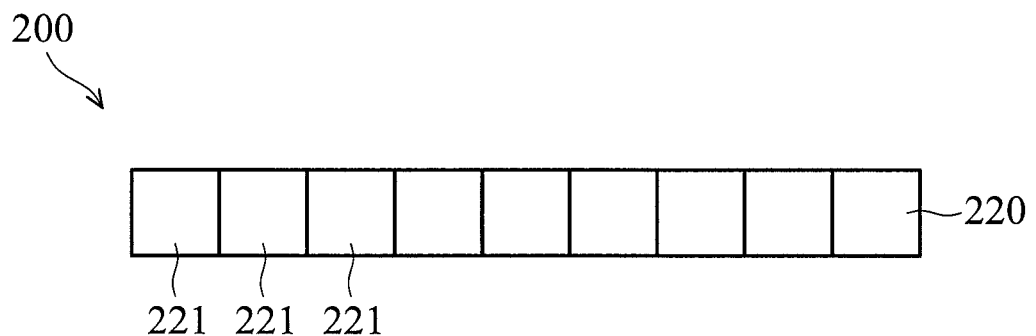
FIG. 2A is a side view of an image sensor in accordance with an embodiment of the invention.

However, the concept of phase delay of the phase-shifting digital holography algorithm can be used in an image sensor of the invention. FIG. 2A is a side view of an image sensor in accordance with an embodiment of the invention. For purposes of description, the image sensor 200, for example, is a mono-color image sensor. As illustrated in FIG. 2A, the image sensor 200 includes a sensor array 220. The sensor array 220 includes a plurality of photoelectric elements 221 for receiving an incident light. The photoelectric elements 221 can be implemented on a substrate 230 (as shown in FIG. 2C and FIG. 2D) via semiconductor manufacturing processes. It should be noted that no lens is used in the image sensor 200 and, for purposes of description, the sensor array 220 in FIG. 2A does not show the relative height (i.e. thickness) of the photoelectric elements in the sensor array.

Figure 2B:
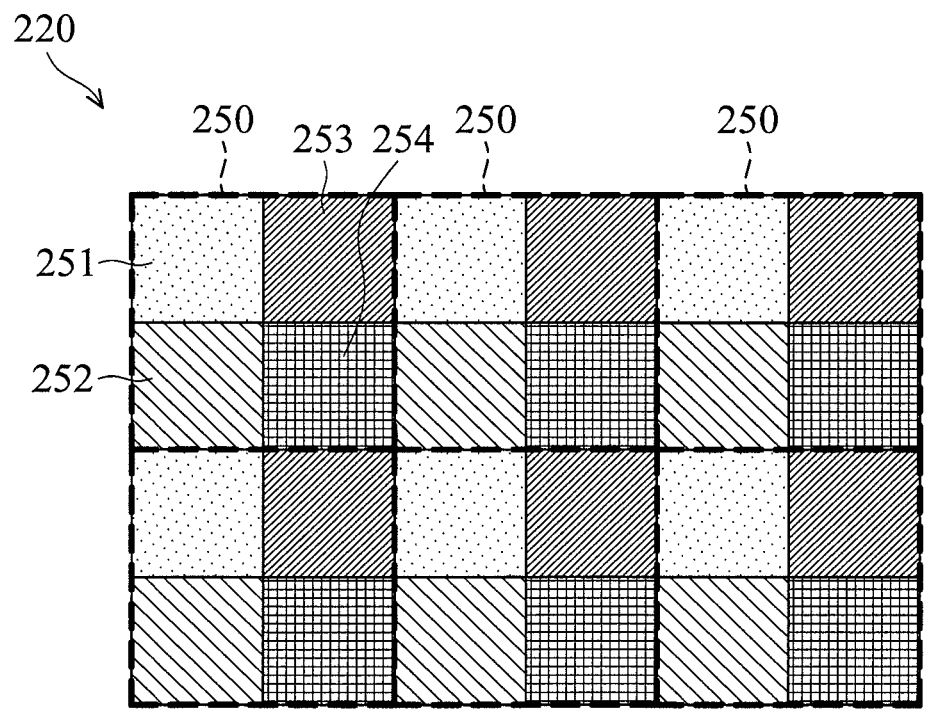
FIG. 2B is a top view of an image sensor in accordance with the embodiment of FIG. 2A.
Figure 2C:
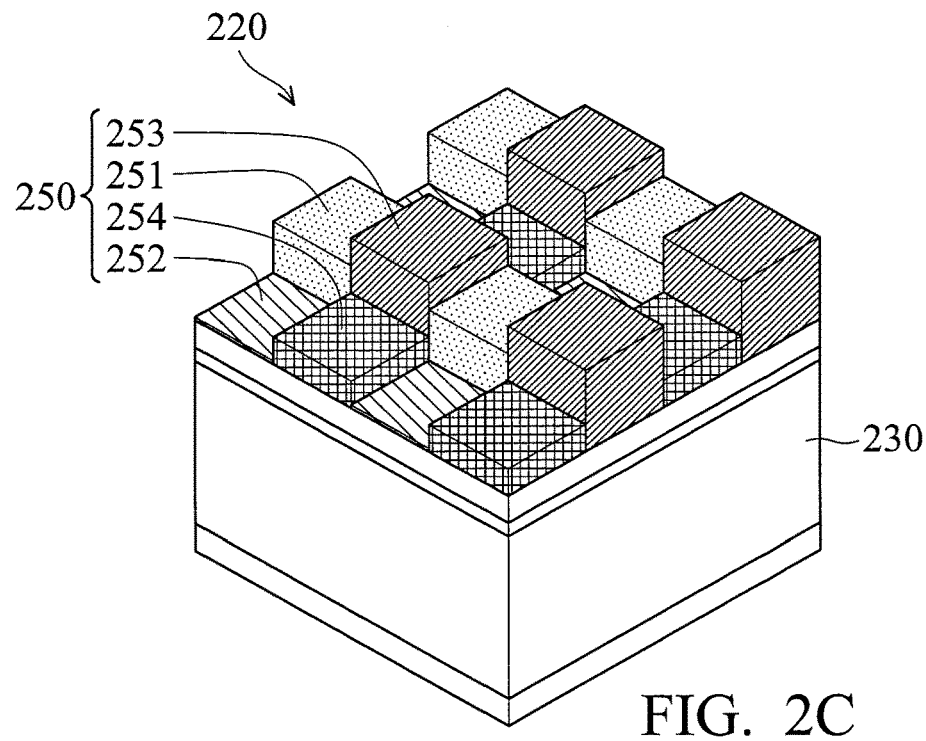
FIG. 2C is an oblique view of the image sensor in accordance with the embodiment of FIG. 2A.
Figure 2D:
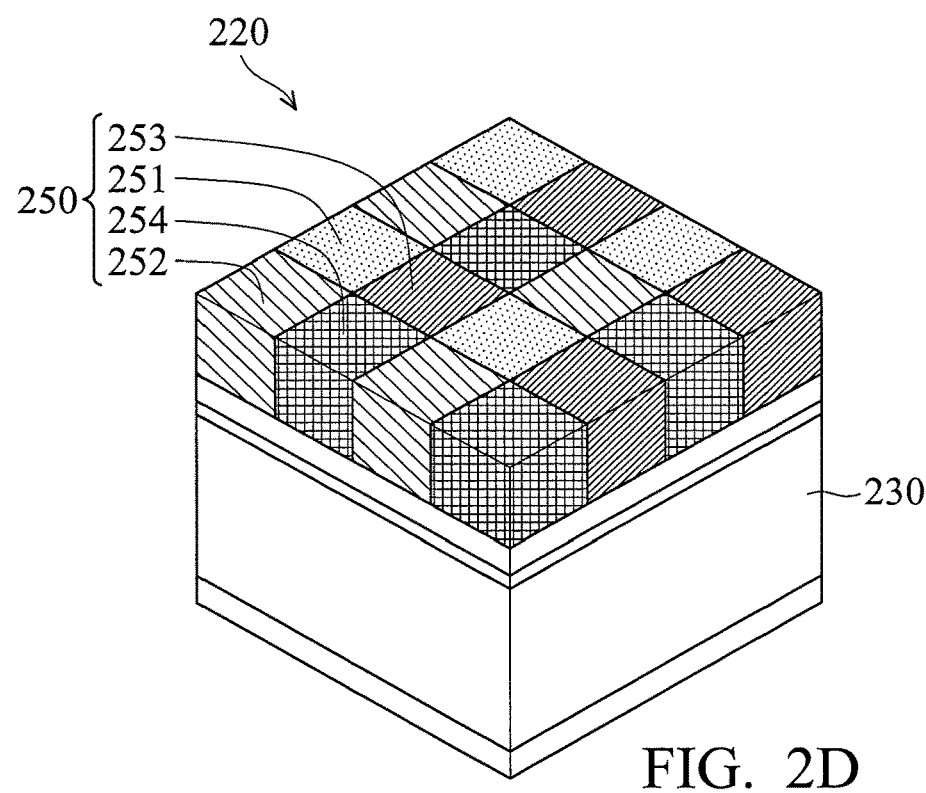
FIG. 2D is an oblique view of the image sensor in accordance with another embodiment of the invention.

FIG. 2B is a top view of an image sensor in accordance with the embodiment of FIG. 2A. FIG. 2C is an oblique view of the image sensor in accordance with the embodiment of FIG. 2A.

As illustrated in FIG. 2B, the sensor array 220 includes a plurality of unit cells 250, where each unit cell has four photoelectric elements arranged in a 2×2 array. For example, the photoelectric elements 251, 252, 253 and 254 are different heights, and the height of each of the photoelectric elements 251, 252, 253, and 254 represents a specific phase of a corresponding hologram. The heights of the photoelectric elements 251~254 can be calculated using the following formula:

$$\delta_m = \frac{2\pi n d_m}{\lambda} \quad (6)$$

where $\lambda$ denotes a specific wavelength; n denotes the refractive index of the material of the photoelectric elements; and $\delta_m$ denotes a given phase value such as 0, $\pi/2$, $\pi$, and $3\pi/2$. It should be noted that all photoelectric elements in the sensor array 220 can be implemented by the same material and thus have the same refractive index. Specifically, a 4-step phase-shifting holography method is employed into the architecture of the image sensor 200. For example, the heights of the photoelectric elements 251-254 are $d_0$, $d_1$, $d_2$, and $d_3$ that correspond to the phases $\delta_0$, $\delta_1$, $\delta_2$, and $\delta_3$, respectively. The value of $\delta_0$, $\delta_1$, $\delta_2$, and $\delta_3$ are 0, $\pi/2$, $\pi$, and $3\pi/2$, respectively. Since the heights $d_0$~$d_4$ match formula (6), the values of $d_0$, $d_1$, $d_2$, and $d_3$ can be calculated as 0, $\lambda/4n$, $\lambda/2n$, and $3\lambda/4n$, respectively. The differences of the heights of the photoelectric elements 251~254 are illustrated in FIG. 2C. It should be noted that the unit cell 250 is repeatedly arranged in the sensor array, and each of the photoelectric elements in each unit cell 250 may capture a pixel in an individual phase of four different phases. For example, the photoelectric elements 251, 252, 253, and 254 in each unit cell 250 may capture a first pixel in a first phase, a second pixel in a second phase, a third pixel in a third phase, and a fourth pixel in a fourth phase, respectively. Since the first pixel, the second pixel, the third pixel, and the fourth pixel are captured by photoelectric elements 251~254 in each unit cell 250, and thus the location of the first pixel, the second pixel, the third pixel, and the fourth pixel are substantially the same. For example, the hologram image for $\delta_0$ can be obtained from the captured pixel of the photoelectrical element 251 in each unit cell 250. Similarly, the hologram images for $\delta_1$, $\delta_2$, and $\delta_3$ can be obtained from the captured pixel of the photoelectrical elements 251, 252, 253 in each unit cell 250, respectively.

After obtaining hologram images in four phases, the object wave in the Fourier domain can be obtained using formula (5). Subsequently, an inverse Fourier transform is performed on the object wave to reconstruct the object image in the spatial domain. Alternatively, a transfer function $H(x, y)$ for transforming the object wave in the Fourier domain to the object image in the spatial domain can be estimated in advance, and thus a convolution between the object wave and the transfer function can be performed to obtain the object image.

FIG. 2D is an oblique view of the image sensor in accordance with another embodiment of the invention. In another embodiment, the positions of the photoelectric elements 251~254 in the unit cell 250 are the same as those in FIG. 2B, but the heights of the photoelectric elements 251~254 in the unit cell 250 are the same, as illustrated in FIG. 2D. For example, the photoelectric elements 251~254 are made of different materials that have different refractive indexes. Specifically, the refractive index of the material of each photoelectric element should follow the following formula:

$$\delta_m = \frac{2\pi n_m d}{\lambda} \quad (7)$$

Referring to formula (7), the height d is a constant, and the refractive index $n_m$ is a variable. The 4-step phase-shifting holography can also be used here. For example, the phases in the 4-step phase-shifting holography method are $\pi/4$, $3\pi/4$, $5\pi/8$, and $7\pi/8$. Given that the height d is equal to $0.5\lambda$, the refractive indexes of the materials of the photoelectric elements 251~254 are ranged from 0.5~1.2.

Figure 3:
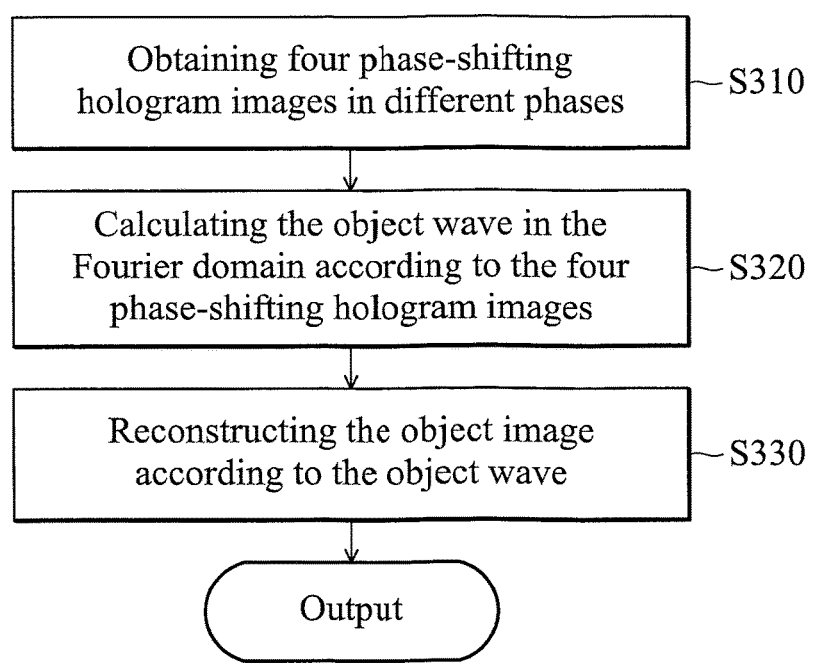
FIG. 3 is a flow chart of a 4-step phase-shifting holography method for use in an image sensor in accordance with an embodiment of the invention.

FIG. 3 is a flow chart of a 4-step phase-shifting holography method for use in an image sensor in accordance with an embodiment of the invention. In step S310, four phase-shifting hologram images in different phases are obtained. For example, the image sensor 200 shown in FIG. 2C or FIG. 2D can be used. For purposes of description, the image sensor in FIG. 2C is used in the following embodiments. Specifically, the four phase-shifting hologram images correspond to the phases 0, $\pi/2$, $\pi$, and $3\pi/2$.

In step S320, the object wave in the Fourier domain is calculated according to the four phase-shifting hologram images in different phases. For example, the intensities of the holograms in different phases such as 0, π/2, π, and 3π/2, can be calculated using formulas (1)~(4), and the object wave can be calculated using formula (5). However, to simplify the calculation of the object wave, the object wave $\varphi_0$ can be calculated approximately using the following formula:

$$\varphi_0 \approx (I_0 - I_\pi) - j(I_{\pi/2} - I_{3\pi/2}) \quad (8)$$

In step S330, the object image is reconstructed according to the object wave. For example, the object wave $\varphi_0$ is in the Fourier domain and the object image is in the spatial domain, and thus an inverse Fourier transform can be applied on the object wave $\varphi_0$ to reconstruct the object image. Alternatively, a transfer function H(x, y) for transforming the object wave in the Fourier domain to the object image in the spatial domain can be estimated in advance, and thus a convolution between the object wave and the transfer function can be performed to obtain the object image.

Figure 4A:
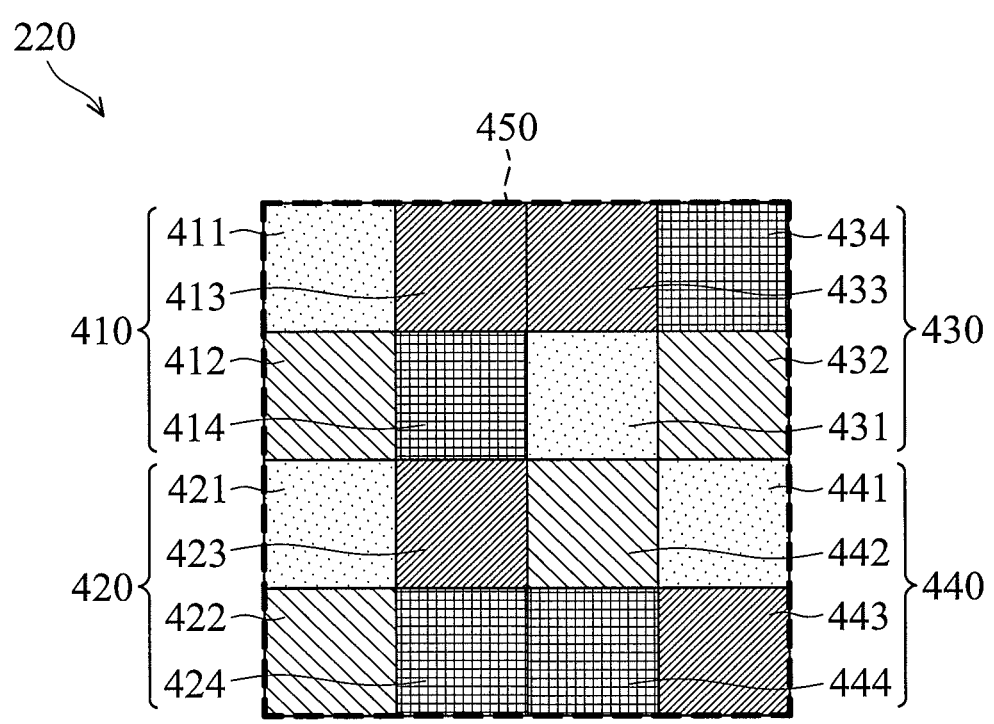
FIG. 4A is a top view of an image sensor in accordance with yet another embodiment of the invention.
Figure 4B:
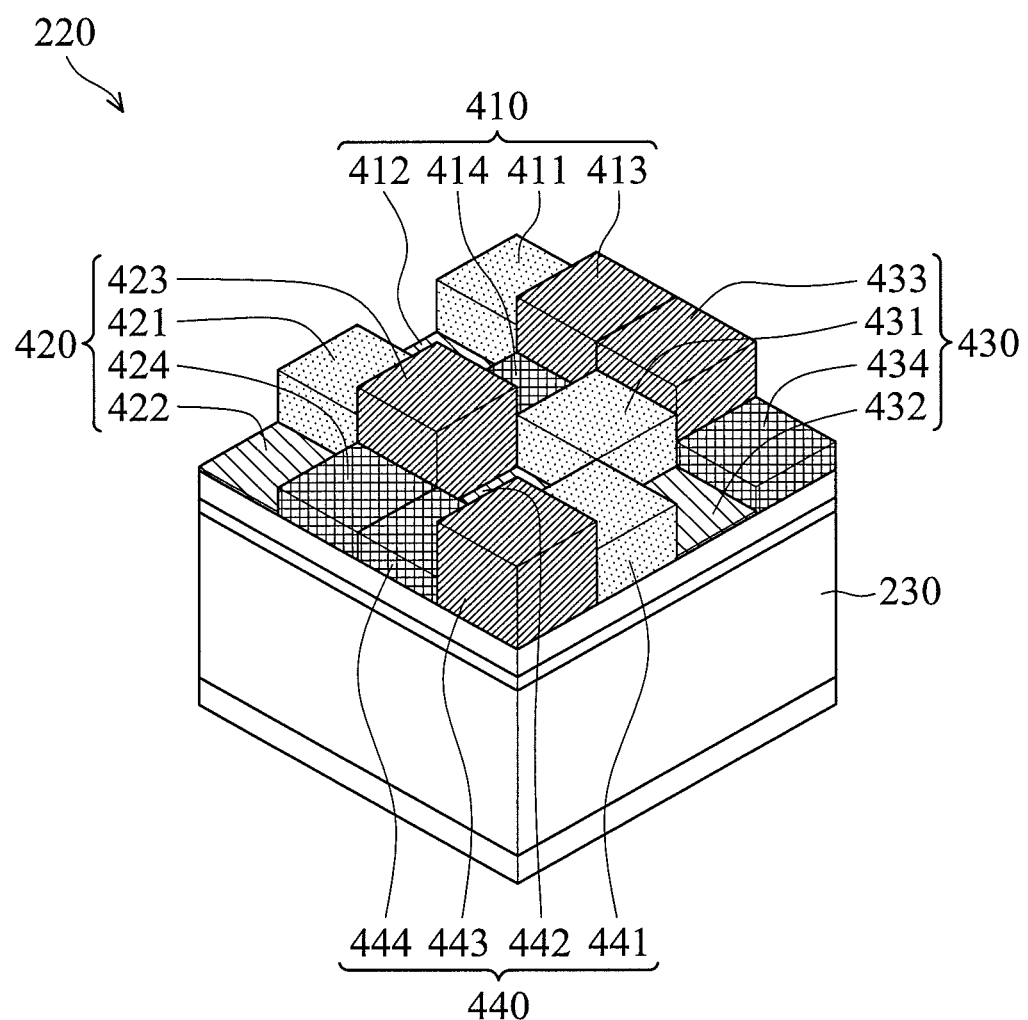
FIG. 4B is an oblique view of an image sensor in accordance with the embodiment of FIG. 4A.

FIG. 4A is a top view of an image sensor in accordance with yet another embodiment of the invention. FIG. 4B is an oblique view of an image sensor in accordance with the embodiment of FIG. 4A. As described in the embodiment of FIG. 2B, each unit cell includes four photoelectric elements arranged in a 2×2 array. Referring to FIG. 4A, in yet another embodiment, the sensor array 220 includes a plurality of macro unit cells, and each macro unit cell includes four unit cells arranged in an 2×2 unit cell array. Specifically, each macro unit cell includes 16 photoelectric elements arranged in a 4×4 array.

For example, the macro unit cell 450 includes unit cells 410, 420, 430, and 440, and each unit cell includes four photoelectric elements, and each photoelectric element in each unit cell captures a pixel in an individual phase of four different phases. The heights of the photoelectric elements in the unit cells 410, 420, 430, and 440 follow the 4-step phase-shifting holography method as described above such as phases 0, π/2, π, and 3π/2 being used. Additionally, two of the unit cells 410, 420, 430, and 440 in the macro cell unit 450 are rotated. Specifically, the unit cell 430 is rotated 90 degrees counterclockwise relative to the unit cell 410, and the unit cell 440 is rotated 90 degrees clockwise relative to the unit cell 420 in order to prevent the Moiré effect from occurring in each captured hologram image, and the corresponding oblique view of the image sensor.

It should be noted that the rotation of the unit cells 430 and 440 shown in FIG. 4A is an example, and the invention is not limited thereto. One or more unit cells in the macro cell unit 450 can be rotated in a predetermined arrangement (e.g. by one or more predetermined angles) to prevent the Moiré effect.

Figure 5A:
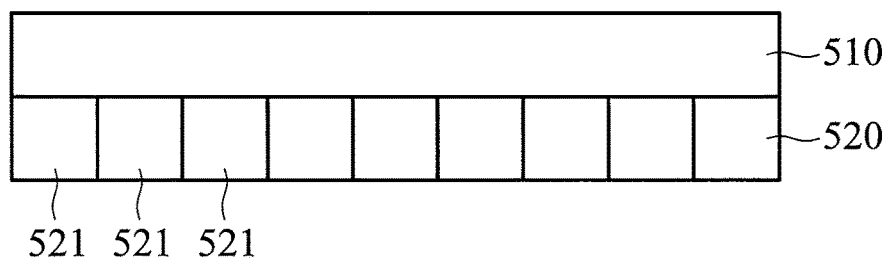
FIG. 5A is a side view of a color image sensor in accordance with an embodiment of the invention.

FIG. 5A is a side view of a color image sensor in accordance with an embodiment of the invention. The color image sensor 500 includes a filter array 510 and a sensor array 520. The filter array 510 includes a plurality of color filters such as red filters 511, green filters 512, and blue filters 513. For example, two green filters, one red filter, and one blue filter are arranged into a 2×2 color filter array of a Bayer pattern. The sensor array 520 includes a plurality of photoelectric elements 521 for receiving the incident light via the filter array 510. The photoelectric elements 521 are arranged into a plurality of unit cells. For purposes of description, the sensor array 520 in FIG. 5A does not show the relative heights of the photoelectric elements in the sensor array 520.

Figure 5B:
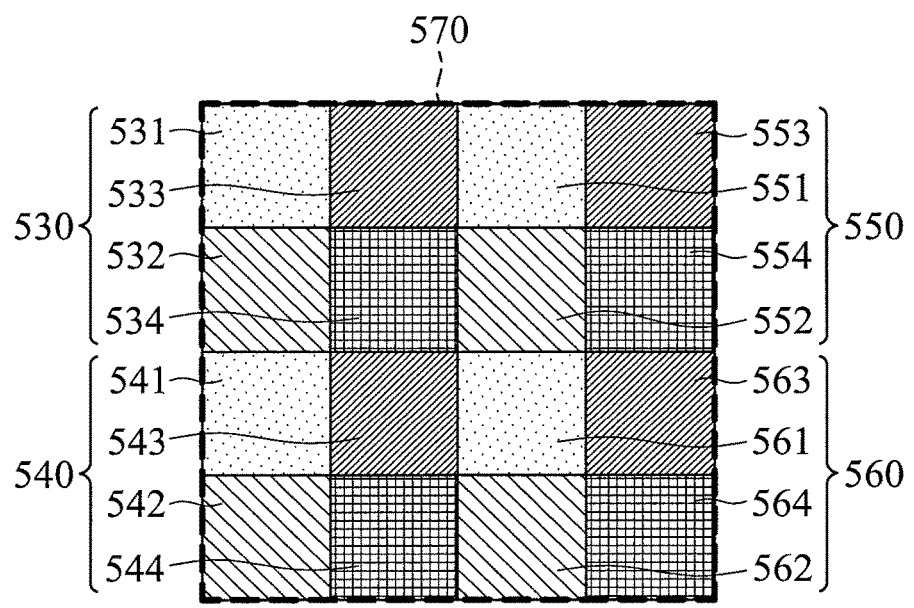
FIG. 5B is a top view of the color image sensor in accordance with the embodiment of FIG. 5A.
Figure 5C:
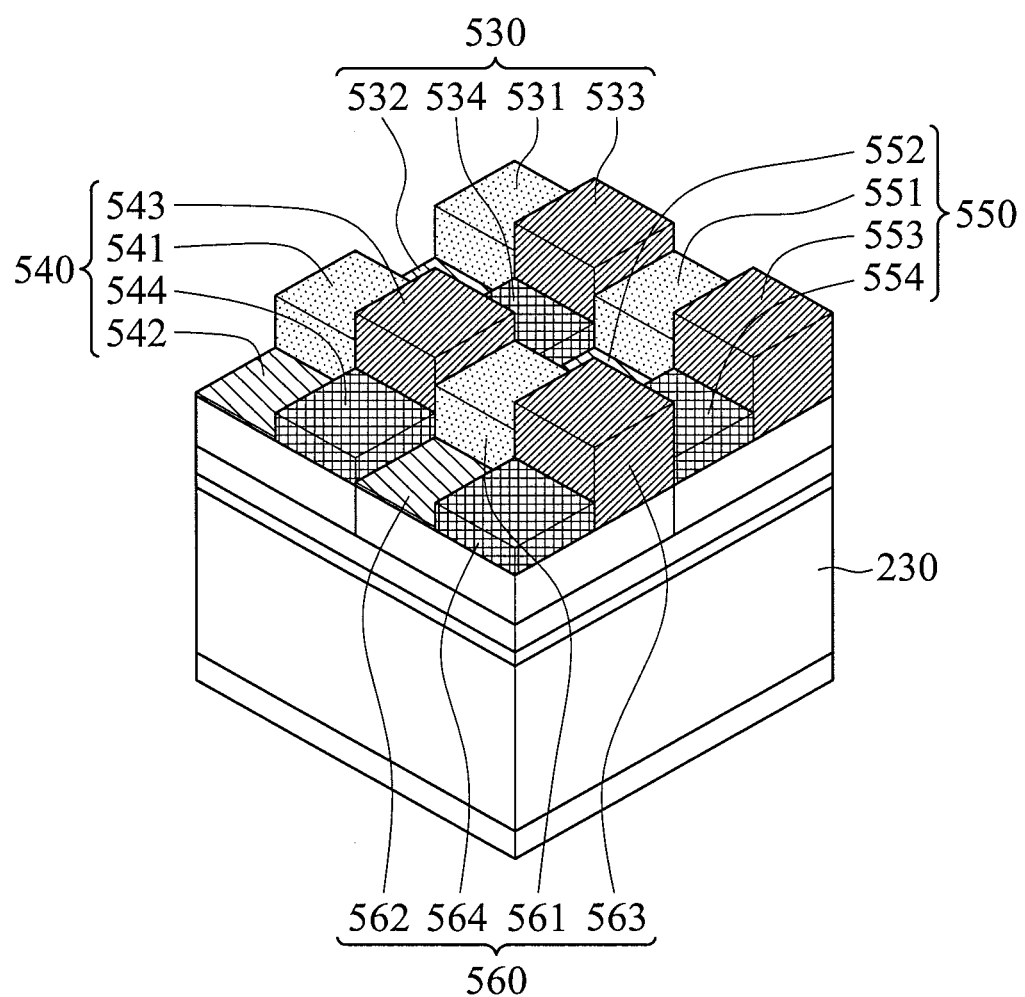
FIG. 5C is an oblique view of the color image sensor in accordance with the embodiment of FIG. 5A.

FIG. 5B is a top view of the color image sensor in accordance with the embodiment of FIG. 5A. FIG. 5C is an oblique view of the color image sensor in accordance with the embodiment of FIG. 5A. As illustrated in FIG. 5B, the unit cells 530, 540, 550, and 560 are arranged in a 2×2 array that corresponds to a 2×2 color filter array in the filter array 510. Thus, the unit cells 530, 540, 550, and 560 receive green light, blue light, red light, and green light through 2×2 color filter array in the filter array 510, respectively. Specifically, the four unit cells 530, 540, 550, and 560 in the macro unit cell 570 are configured to capture green, blue, red, and green pixels in four different phases such as 0, π/2, π, and 3π/2. The design of heights of the photoelectric elements 531~534, 541~544, 551~554, and 561~564 in the unit cells 530, 540, 550, and 560 may follow formula (6) as described above when the photoelectric elements in the sensor array 520 are made of the same material, and thus the details will be omitted here. However, formula (6) is designed for a single color with a fixed wavelength.

Given that $\lambda_R$, $\lambda_G$, and $\lambda_B$ represent the wavelengths of the red light, green light, and blue light respectively, it can be concluded that the relationship between the wavelengths is $\lambda_R > \lambda_G > \lambda_B$, since the red light has the longest wavelength and the blue light has the shortest wavelength among red, green, and blue lights. Accordingly, assuming that the photoelectric elements in the sensor array 520 are made of the same material, the photoelectric elements 551~554 in the unit cell 550 for receiving the red light have relatively greater heights than the photoelectric elements in other unit cells in the macro unit cell 670. That is, the heights of the photoelectric elements in each unit cell are proportional to the wavelength of the received light.

For example, referring to FIG. 5C, the heights of the photoelectric elements 551~554 in the unit cell 550 for receiving the red light are relatively higher than those of the co-located photoelectric elements 531-534 (i.e. the same phase) in the unit cell 530 for receiving the green light.

Figure 5D:
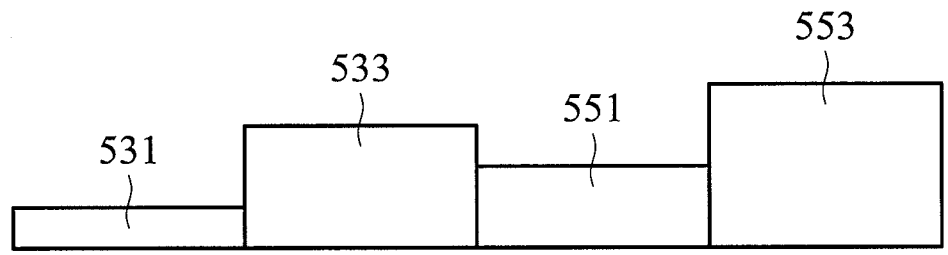
FIG. 5D is a portion of a detailed side view in accordance with the embodiment of FIG. 5A.
Figure 5E:
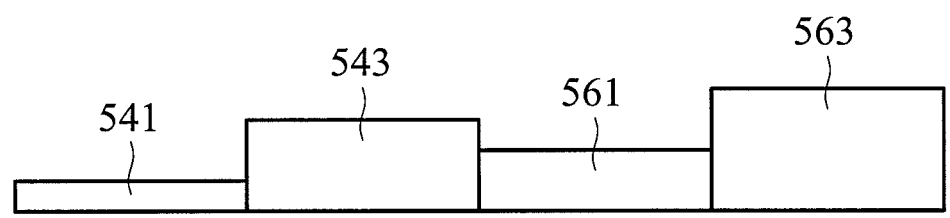
FIG. 5E is another portion of a detailed side view in accordance with the embodiment of FIG. 5A.

FIG. 5D is a portion of a detailed side view in accordance with the embodiment of FIG. 5A. FIG. 5E is another portion of a detailed side view in accordance with the embodiment of FIG. 5A. The side view in FIG. 5D shows the relative heights of the photoelectric elements 531~532 in the unit cell 530 for receiving the green light and the photoelectric elements 551~552 in the unit cell 550 for receiving the red light. For the same phase, the photoelectric element 551 has a greater height than the photoelectric element 531, and the photoelectric element 552 has a greater height than the photoelectric element 532.

The side view in FIG. 5E shows the relative heights of the photoelectric elements 531~532 in the unit cell 530 for receiving the green light and the photoelectric elements 541~542 in the unit cell 540 for receiving the blue light. For the same phase, the photoelectric element 531 has a greater height than the photoelectric element 541, and the photoelectric element 532 has a greater height than the photoelectric element 542.

Since the macro unit cell 570 is repeatedly arranged in the sensor array 520, four phase-shifting hologram images are obtained by combining pixels captured by each of the unit cells 530, 540, 550, and 560 of the macro unit cells in the sensor array 520, and thus total 16 phase-shifting hologram images can be obtained. It should be noted that the green phase-shifting hologram image captured by the unit cell 530 is different from that captured by the unit cell 560. For example, the total 16 phase-shifting hologram images can be $(R\delta_0, R\delta_1, R\delta_2, R\delta_3)$, $(G_1\delta_0, G_1\delta_1, G_1\delta_2, G_1\delta_3)$, $(B\delta_0, B\delta_1, B\delta_2, B\delta_3)$, and $(G_2\delta_0, G_2\delta_1, G_2\delta_2, G_2\delta_3)$, where the green phase-shifting hologram images ($G_1\delta_0$, $G_1\delta_1$, $G_1\delta_2$, $G_1\delta_3$) are captured by the unit cell 530, and the green phase-shifting hologram images ($G_2\delta_0$, $G_2\delta_1$, $G_2\delta_2$, $G_2\delta_3$) are captured by the unit cell 560.

Figure 6:
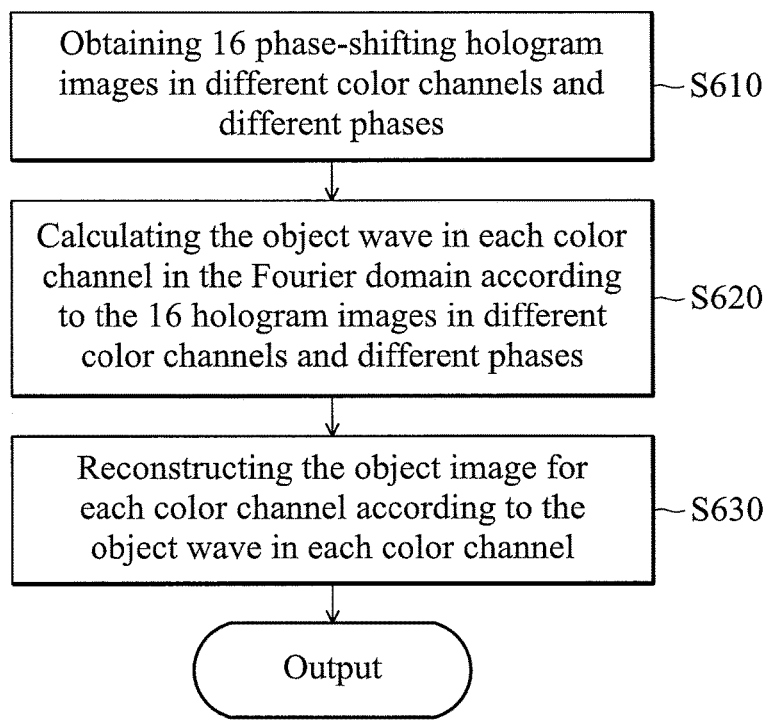
FIG. 6 is a flow chart of a 4-step phase-shifting holography method for use in a color image sensor in accordance with an embodiment of the invention.

FIG. 6 is a flow chart of a 4-step phase-shifting holography method for use in a color image sensor in accordance with an embodiment of the invention. Distinct from the flow chart in FIG. 3, the flow chart in FIG. 6 is for use in a color image sensor. In step S610, 16 phase-shifting hologram images in different color channels and different phases are obtained. For example, the image sensor 500 shown in FIG. 5 can be used. The 16 phase-shifting hologram images are ($R\delta_0$, $R\delta_1$, $R\delta_2$, $R\delta_3$), ($G_1\delta_0$, $G_1\delta_1$, $G_1\delta_2$, $G_1\delta_3$), ($B\delta_0$, $B\delta_1$, $B\delta_2$, $B\delta_3$), and ($G_2\delta_0$, $G_2\delta_1$, $G_2\delta_2$, $G_2\delta_3$), as described above.

In step S620, the object wave in each color channel in the Fourier domain is calculated according to the 16 hologram images in different color channels and different phases.

In step S630, the object image for each color channel is reconstructed according to the object wave in each color channel. Specifically, there are four color channels such as one red channel, one blue channel, and two green channels for a color image sensor, and the operations for calculating the object wave and reconstructing the object image in a single color channel can be referred to in the embodiment of FIG. 3, and the details will not be repeated here.

Thus, four object images representing one red channel, one blue channel, and two green channels are obtained after step S330, and an image signal processor (not shown) coupled to the color image sensor 500 may reconstruct the original color image using the four object images.

Figure 7A:
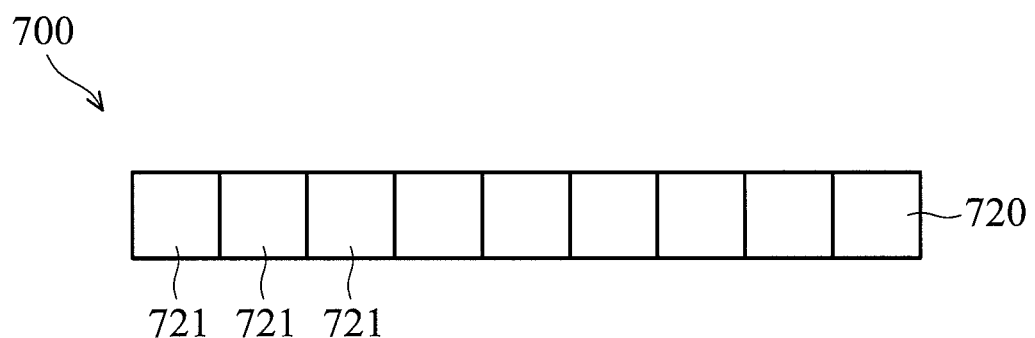
FIG. 7A is a side view of an image sensor in accordance with an embodiment of the invention.

FIG. 7A is a side view of an image sensor in accordance with an embodiment of the invention. For purposes of description, the image sensor 700, for example, is a mono-color image sensor. As illustrated in FIG. 7A, the image sensor 700 includes a sensor array 720. The sensor array 720 includes a plurality of photoelectric elements 721 for receiving an incident light. The photoelectric elements 721 can be implemented on a substrate via semiconductor manufacturing processes. It should be noted that no lens is used in the image sensor 700 and, for purposes of description, the sensor array 720 in FIG. 7A does not show the relative height (i.e. thickness) of the photoelectric elements in the sensor array.

Figure 7B:
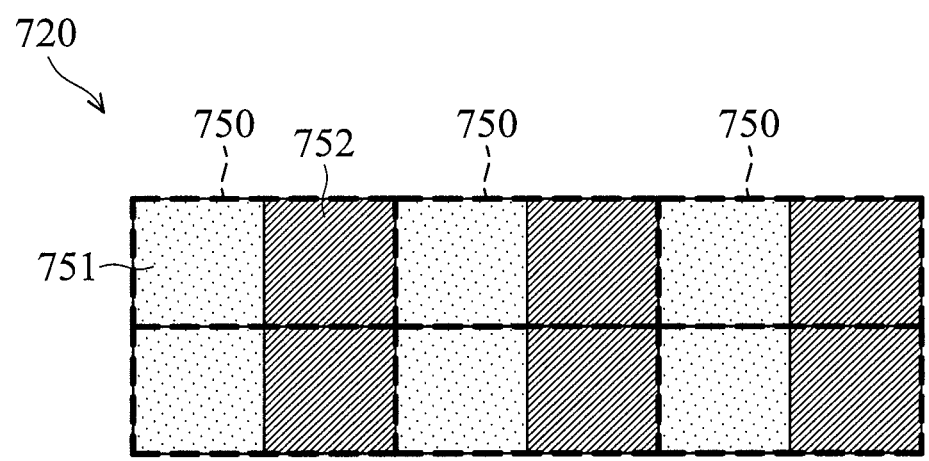
FIG. 7B is a top view of an image sensor in accordance with the embodiment of FIG. 7A.
Figure 7C:
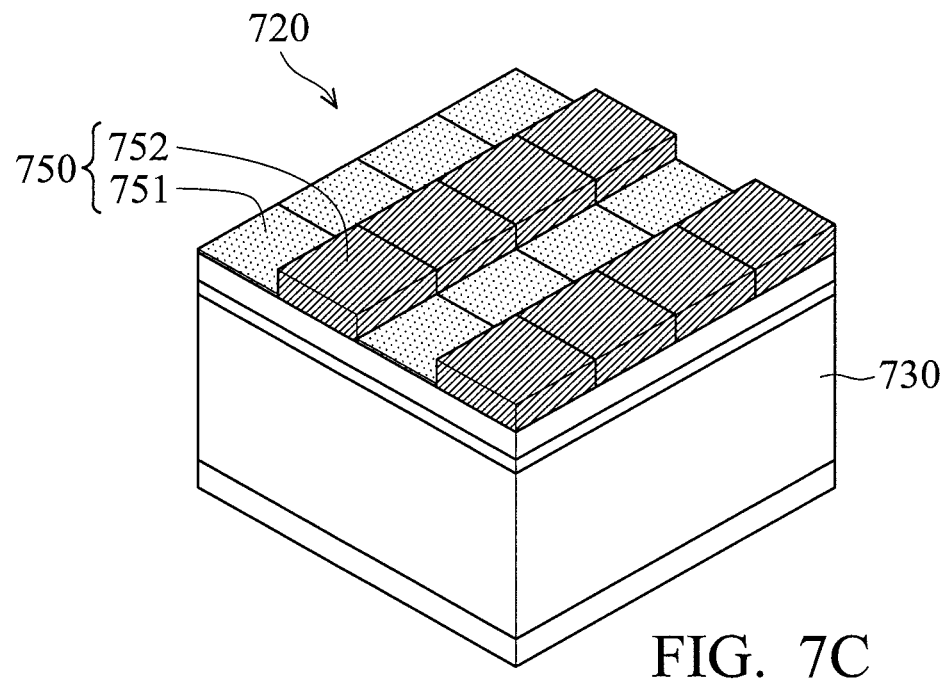
FIG. 7C is an oblique view of the image sensor in accordance with the embodiment of FIG. 7A.

FIG. 7B is a top view of an image sensor in accordance with the embodiment of FIG. 7A. FIG. 7C is an oblique view of the image sensor in accordance with the embodiment of FIG. 7A.

As illustrated in FIG. 7B, the sensor array 720 includes a plurality of unit cells 750, where each unit cell has two photoelectric elements arranged in a 2×1 array. For example, the photoelectric elements 751 and 752 are different heights, and the height of each of the photoelectric elements 751 and 752 represents a specific phase of a corresponding hologram. For example, a 2-step quadrature phase-shifting holography method is used for the sensor array 720, and two different phases may be 0 and $\pi/2$. After obtaining the intensity of the interference patterns at phases 0 and $\pi/2$, the complex amplitude of the object light is given by:

$$\psi_0 = \frac{(I_0 - |\psi_0|^2 - |\psi_r|^2) - j(I_{\pi/2} - |\psi_0|^2 - |\psi_r|^2)}{2\psi_r^*} \quad (9)$$

For example, the heights of the photoelectric elements 751 and 752 can be calculated by the following formula:

$$\delta_m = \frac{2\pi n d_m}{\lambda} \quad (10)$$

where $\lambda$ denotes a specific wavelength; n denotes the refractive index of the material of the photoelectric elements; and $\delta_m$ denotes a given phase value such as 0 and $\pi/2$ (or $\pi$ and $3\pi/2$). It should be noted that all photoelectric elements in the sensor array 720 can be implemented by the same material and thus have the same refractive index. Specifically, a 2-step phase-shifting holography method is employed into the architecture of the image sensor 700. For example, the heights of the photoelectric elements 752 and 752 are $d_0$ and $d_1$ that correspond to the phases $\delta_0$ and $\delta_1$, respectively. The value of $\delta_0$, and $\delta_1$, are 0 and $\pi/2$ (or $\pi$ and $3\pi/2$), respectively. Since the heights $d_0$~$d_1$ match formula (10), the values of $d_0$ and $d_1$ can be calculated as 0 and $\lambda/4n$, respectively. The differences of the heights of the photoelectric elements 751 and 752 are illustrated in FIG. 7C. It should be noted that the unit cell 750 is repeatedly arranged in the sensor array 720, and each of the photoelectric elements in each unit cell 750 may capture a pixel in an individual phase of two different phases. For example, the photoelectric elements 751 and 752 in each unit cell 750 may capture a first pixel in a first phase and a second pixel in a second phase, respectively. Since the first pixel and the second pixel, are captured by photoelectric elements 751 and 752 in each unit cell 750, and thus the location of the first pixel and the second pixel are substantially the same. For example, the hologram image for $\delta_0$ can be obtained from the captured pixel of the photoelectrical element 751 in each unit cell 750. Similarly, the hologram image for $\delta_1$ can be obtained from the captured pixel of the photoelectrical element 752 in each unit cell 750.

After obtaining hologram images in two phases, the object wave in the Fourier domain can be obtained using formula (9). Subsequently, an inverse Fourier transform is performed on the object wave to reconstruct the object image in the spatial domain. Alternatively, a transfer function H(x, y) for transforming the object wave in the Fourier domain to the object image in the spatial domain can be estimated in advance, and thus a convolution between the object wave and the transfer function can be performed to obtain the object image.

Figure 7D:
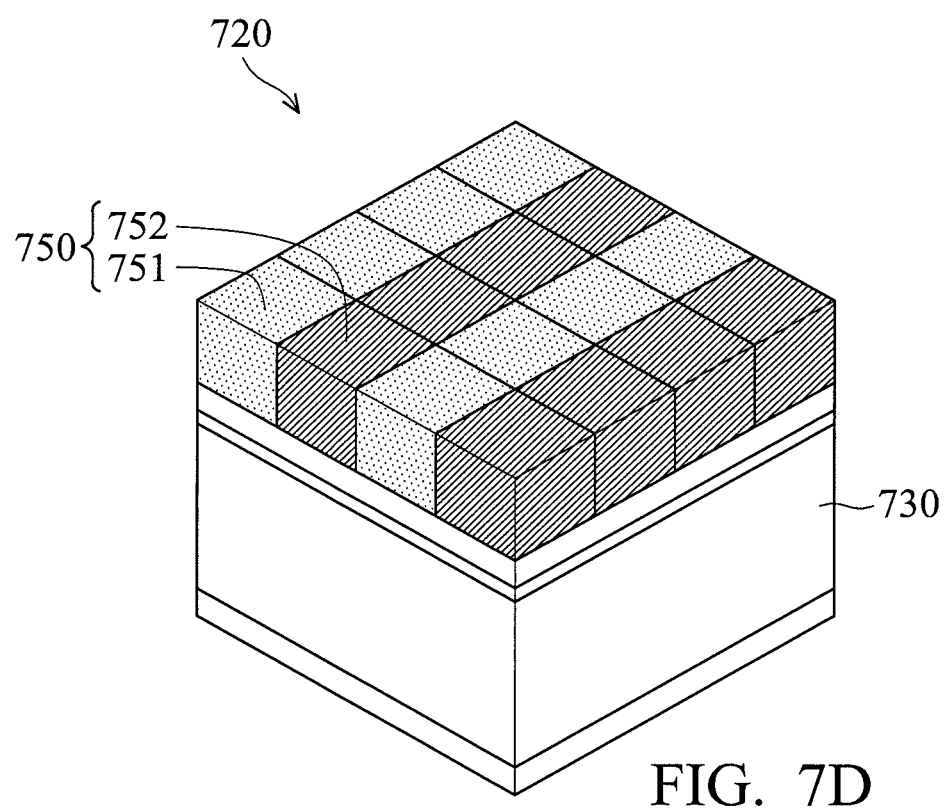
FIG. 7D is an oblique view of the image sensor in accordance with another embodiment of the invention.

FIG. 7D is an oblique view of the image sensor in accordance with another embodiment of the invention. In another embodiment, the positions of the photoelectric elements 751 and 752 in the unit cell 750 are the same as those in FIG. 7B, but the heights of the photoelectric elements 751 and 752 in each unit cell 750 are the same, as illustrated in FIG. 7D. For example, the photoelectric elements 751 and 752 are made of different materials that have different refractive indexes. Specifically, the refractive index of the material of each photoelectric element should follow the following formula:

$$\delta_m = \frac{2\pi n_m d}{\lambda} \quad (11)$$

Referring to formula (11), the height d is a constant, and the refractive index $n_m$ is a variable. The 2-step phase-shifting holography can also be used here. For example, the phases in the 2-step phase-shifting holography method are 0 and $\pi/2$ (or $\pi$ and $3\pi/2$). Given that the height d is equal to 0.52λ, the refractive indexes of the materials of the photoelectric elements 751 and 752 can be calculated using formula (11).

Figure 8A:
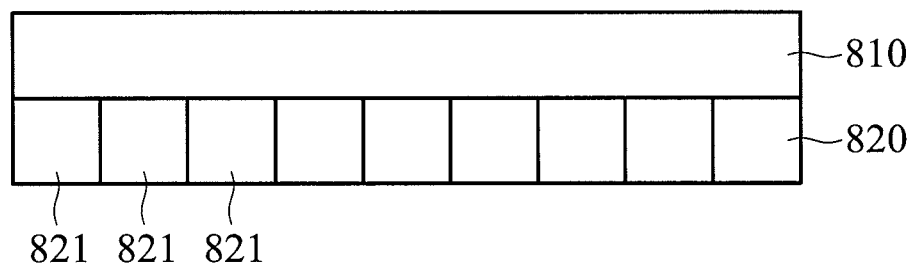
FIG. 8A is a side view of a color image sensor in accordance with another embodiment of the invention.

FIG. 8A is a side view of a color image sensor in accordance with another embodiment of the invention. The color image sensor 800 includes a filter array 810 and a sensor array 820. The filter array 810 includes a plurality of color filters such as red filters, green filters, and blue filters. For example, two green filters, one red filter, and one blue filter are arranged into a 2×2 color filter array of a Bayer pattern. The sensor array 820 includes a plurality of unit cells 821 that receives light via the filter array 810. For purposes of description, the sensor array 820 in FIG. 8A does not show the relative heights of the photoelectric elements in the sensor array 820.

Figure 8B:
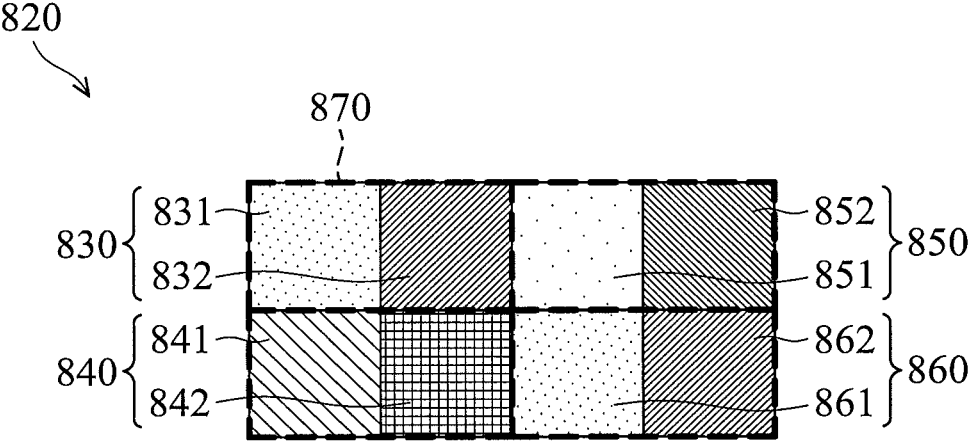
FIG. 8B is a top view of the color image sensor in accordance with the embodiment of FIG. 8A.

FIG. 8B is a top view of the color image sensor in accordance with the embodiment of FIG. 8A. As illustrated in FIG. 7B, the unit cells 830, 840, 850, and 860 receives green light, blue light, red light, and green light, respectively. Each of the unit cells 830, 840, 850, and 860 has two photoelectric elements, and has a corresponding color filter. For example, the unit cells 830, 840, 850, and 860 receive the green light, blue light, red light, and green light via the filter array 810. Specifically, a macro unit cell 870 in the form of the Bayer pattern can be formed using the unit cells 830, 840, 850, and 860.

In the embodiment, a 2-step phase-shifting holography method is used. For example, two photoelectric elements in each unit cell have different heights that are designed to receive pixels in different phases such as 0 and π/2.

The design of heights of the photoelectric elements 831-832, 841-842, 851-853, and 861-862 in the unit cells 830, 840, 850, and 860 may follow formula (6) as described above when the photoelectric elements in the sensor array 820 are made of the same material, and thus the details will be omitted here. However, formula (6) is designed for a single color with a fixed wavelength.

Given that $\lambda_R$, $\lambda_G$, and $\lambda_B$ represent the wavelengths of the red light, green light, and blue light respectively, it can be concluded that the relationship between the wavelengths is $\lambda_R > \lambda_G > \lambda_B$, since the red light has the longest wavelength and the blue light has the shortest wavelength among red, green, and blue lights. Accordingly, assuming that the photoelectric elements in the sensor array 820 are made of the same material, the photoelectric elements 851~852 in the unit cell 850 for receiving the red light have relatively greater height than the photoelectric elements in other unit cells in the macro unit cell 870.

Compared with the sensor array 520 in FIG. 5, the resolution along the vertical direction is double when using the sensor array 820 because the size of a macro unit cell is 4×2 in the sensor array 820 while the size of a macro unit cell is 4×4 in the sensor array 820. However, the computation complexity for obtaining the object wave using the sensor array 820 becomes higher. For example, the object wave in the 2-step quadrature phase-shifting holography method can be calculated using the following formula:

$$\psi_0 = \frac{(I_0 - |\psi_0|^2 - |\psi_r|^2) - j(I_{\pi/2} - |\psi_0|^2 - |\psi_r|^2)}{2\psi_r^*} \quad (10)$$

In view of the above, a lens-free image sensor is provided. By arranging photoelectric elements with different heights, that are designed for different phases in a 4-step phase-shifting holography algorithm, into a sensor array, an object image can be reconstructed using the phase-shifting hologram images captured by the photoelectric elements, and thus no modular lens is required in the camera module using the lens-free image sensor, and thus the cost of the whole camera module can be reduced and the thickness of the camera module can be thinner.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image sensor, comprising:
a plurality of photoelectric elements for receiving an incident light,
wherein the photoelectric elements are arranged into a plurality of unit cells, and each of the unit cells comprises a first photoelectric element and a second photoelectric element,
wherein the first photoelectric element in each of the unit cells captures a first pixel in a first phase, and the second photoelectric element in each of the unit cells captures a second pixel in a second phase,
wherein the first phase is different from the second phase,
wherein a first phase-shifting hologram image and a second phase-shifting hologram image are obtained by respectively combining the first pixels in the first phase and the second pixels in the second phase captured by the unit cells.

2. The image sensor as claimed in claim 1, wherein each of the unit cells further comprises a third photoelectric element capturing a third pixel in a third phase and a fourth photoelectric element capturing a fourth pixel in a fourth phase,
wherein the first phase, the second phase, the third phase, and the fourth phase are different.

3. The image sensor as claimed in claim 2, wherein the first photoelectric element, the second photoelectric element, the third photoelectric element, and the fourth photoelectric element in each of the unit cells are made of a specific material, and are different heights.

4. The image sensor as claimed in claim 3, wherein the first phase, the second phase, the third phase, and the fourth phase are 0, π/2, π, and 3π/2, respectively.

5. The image sensor as claimed in claim 2, wherein the first photoelectric element, the second photoelectric element, the third photoelectric element, and the fourth photoelectric element in each of the unit cells are made of different materials, and are the same height.

6. The image sensor as claimed in claim 5, wherein the first phase, the second phase, the third phase, and the fourth phase are π/4, 3π/4, 5π/8, and 7π/8, respectively.

7. The image sensor as claimed in claim 1, wherein an object wave is calculated according to the first phase-shifting hologram image and the second phase-shifting hologram image, and an object image is reconstructed by applying an inverse-transform on the object wave.

8. The image sensor as claimed in claim 2, wherein a first phase-shifting hologram image, a second phase-shifting hologram image, a third phase-shifting hologram image, and a fourth phase-shifting hologram image are obtained by respectively combining the first pixels in the first phase, the second pixels in the second phase, the third pixels in the third phase, and the fourth pixels in the fourth phase captured by the unit cells.

9. The image sensor as claimed in claim 8, wherein an object wave is calculated according to the first phase-shifting hologram image, the second phase-shifting hologram image, the third phase-shifting hologram image, and the fourth phase-shifting hologram image, and an object image is reconstructed by applying an inverse-transform on the object wave.

10. The image sensor as claimed in claim 2, wherein the unit cells are arranged into a plurality of macro unit cells, and each of the macro unit cells comprises four unit cells arranged in a 2×2 array, and at least one of the four unit cells in each of the macro unit cells is rotated by a respective predetermined angle.

11. The image sensor as claimed in claim 1, further comprising:
a filter array, comprising:
a first green filter and a second green filter for extracting green light from an incident light;
a red filter for extracting red light from the incident light; and
a blue filter for extracting blue light from the incident light.

12. The image sensor as claimed in claim 11, wherein the unit cells are arranged into a plurality of macro unit cells, and each of the macro unit cells comprises a first unit cell, a second unit cell, a third unit cell, and a fourth unit cell that are arranged into a 2×2 array,
wherein the first unit cell, the second unit cell, the third unit cell, and the fourth unit cell in each of the macro unit cells receive the green light, the green light, the red light, and the blue light via the first green filter, the second green filter, the red filter, and the blue filter, respectively.

13. The image sensor as claimed in claim 12, wherein the first green filter, the second green filter, the red filter, and the blue filter are arranged into a Bayer pattern.

14. The image sensor as claimed in claim 13, wherein heights of the first photoelectric element and the second photoelectric element in the first unit cell, the second unit cell, the third unit cell, and the fourth unit cell in each of the macro unit cells are proportional to wavelengths of the green light, the green light, the red light, and the blue light, respectively.

15. The image sensor as claimed in claim 12, wherein each of the unit cells further comprises a third photoelectric element capturing a third pixel in a third phase and a fourth photoelectric element capturing a fourth pixel in a fourth phase,
wherein the first phase, the second phase, the third phase, and the fourth phase are different.

16. The image sensor as claimed in claim 15, wherein a first green phase-shifting hologram image, a second green phase-shifting hologram image, a third green phase-shifting hologram image, and a fourth green phase-shifting hologram image are obtained by respectively combining the first pixels in the first phase, the second pixels in the second phase, the third pixels in the third phase, and the fourth pixels in the fourth phase captured by the first unit cells,
wherein a fifth green phase-shifting hologram image, a sixth green phase-shifting hologram image, a seventh green phase-shifting hologram image, and an eighth green phase-shifting hologram image are obtained by respectively combining the first pixels in the first phase, the second pixels in the second phase, the third pixels in the third phase, and the fourth pixels in the fourth phase captured by the second unit cells,
wherein a first red phase-shifting hologram image, a second red phase-shifting hologram image, a third red phase-shifting hologram image, and a fourth red phase-shifting hologram image are obtained by respectively combining the first pixels in the first phase, the second pixels in the second phase, the third pixels in the third phase, and the fourth pixels in the fourth phase captured by the third unit cells,
wherein a first blue phase-shifting hologram image, a second blue phase-shifting hologram image, a third blue phase-shifting hologram image, and a fourth blue phase-shifting hologram image are obtained by respectively combining the first pixels in the first phase, the second pixels in the second phase, the third pixels in the third phase, and the fourth pixels in the fourth phase captured by the fourth unit cells.

17. The image sensor as claimed in claim 16, wherein a first green object wave is calculated according to the first green phase-shifting hologram image, the second green phase-shifting hologram image, the third green phase-shifting hologram image, and the fourth green phase-shifting hologram image, and a first green object image is reconstructed by applying an inverse-transform on the first green object wave,
wherein a second green object wave is calculated according to the fifth green phase-shifting hologram image, the sixth green phase-shifting hologram image, the seventh green phase-shifting hologram image, and the eighth green phase-shifting hologram image, and a second green object image is reconstructed by applying the inverse-transform on the second green object wave,
wherein a red object wave is calculated according to the first red phase-shifting hologram image, the second red phase-shifting hologram image, the third red phase-shifting hologram image, and the fourth red phase-shifting hologram image, and a red object image is reconstructed by applying the inverse-transform on the red object wave,
wherein a blue object wave is calculated according to the first blue phase-shifting hologram image, the second blue phase-shifting hologram image, the third blue phase-shifting hologram image, and the fourth blue phase-shifting hologram image, and a blue object image is reconstructed by applying the inverse-transform on the blue object wave.

18. The image sensor as claimed in claim 17, wherein a color image is obtained according to the first green object image, the second green object image, the red object image, and the blue object image.

19. The image sensor as claimed in claim 15, wherein heights of the first photoelectric element, the second photoelectric element, the third photoelectric element, and the fourth photoelectric element in the first unit cell, the second unit cell, the third unit cell, and the fourth unit cell in each of the macro unit cells are proportional to wavelengths of the green light, the green light, the red light, and the blue light, respectively.

* * * * *